US008776119B2

(12) United States Patent
Rolls et al.

(10) Patent No.: US 8,776,119 B2
(45) Date of Patent: Jul. 8, 2014

(54) DISPLAYING AN INFORMATION TICKER IN ASSOCIATION WITH A PERSONALIZED VIDEO MOSAIC IN A TELEVISION SERVICES NETWORK

(75) Inventors: James A. Rolls, Atlanta, GA (US); Steven M. Watkins, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 361 days.

(21) Appl. No.: 12/115,072

(22) Filed: May 5, 2008

(65) Prior Publication Data
US 2009/0037966 A1 Feb. 5, 2009

Related U.S. Application Data

(60) Provisional application No. 60/927,664, filed on May 4, 2007.

(51) Int. Cl.
*H04N 5/445* (2011.01)
*G06F 3/00* (2006.01)
*G06F 13/00* (2006.01)

(52) U.S. Cl.
USPC ............... 725/38; 725/39; 725/43; 725/46

(58) Field of Classification Search
None
See application file for complete search history.

(56) References Cited

U.S. PATENT DOCUMENTS

| | | | |
|---|---|---|---|
| 5,926,230 A | 7/1999 | Niijima et al. | 725/56 |
| 6,005,562 A | 12/1999 | Shiga et al. | 715/721 |
| 6,177,931 B1 * | 1/2001 | Alexander et al. | 725/52 |
| 6,201,536 B1 | 3/2001 | Hendricks et al. | 715/716 |
| 6,456,334 B1 | 9/2002 | Duhault | 348/565 |
| 6,934,965 B2 | 8/2005 | Gordon et al. | |
| 7,174,512 B2 | 2/2007 | Martin et al. | 715/719 |
| 7,373,650 B1 | 5/2008 | Rodriguez et al. | 725/41 |
| 2002/0067376 A1 | 6/2002 | Martin et al. | |
| 2003/0159143 A1 | 8/2003 | Chan | 725/41 |
| 2007/0011702 A1 | 1/2007 | Vaysman | 725/45 |
| 2007/0055989 A1 * | 3/2007 | Shanks et al. | 725/37 |
| 2007/0204302 A1 | 8/2007 | Calzone | 725/46 |
| 2007/0220546 A1 * | 9/2007 | Shanks et al. | 725/38 |
| 2008/0066103 A1 * | 3/2008 | Ellis et al. | 725/38 |
| 2008/0189738 A1 * | 8/2008 | Purpura et al. | 725/38 |
| 2012/0072952 A1 * | 3/2012 | Vaysman et al. | 725/40 |

OTHER PUBLICATIONS

Office Action issued Jan. 6, 2010 in connection with U.S. Appl. No. 11/704,700.
Office Action issued Apr. 17, 2009 in connection with U.S. Appl. No. 11/704,700.
Office Action mailed Jan. 19, 2011, in connection with U.S. Appl. No. 11/704,700.
Notice of Allowance mailed Aug. 8, 2012, in co-pending U.S. Appl. No. 11/704,700.

(Continued)

*Primary Examiner* — Nasser Goodarzi
*Assistant Examiner* — Fred Peng
(74) *Attorney, Agent, or Firm* — Merchant & Gould

(57) ABSTRACT

A video source associated with an information ticker may be captured, and the associated information ticker may be broadcast and displayed below or near an array of simultaneously broadcast video sources being broadcast in a mosaic of video sources. The displayed information ticker may be broadcast in association with one or more of a plurality of simultaneously broadcast video sources in the mosaic of video sources.

21 Claims, 7 Drawing Sheets

(56) References Cited

OTHER PUBLICATIONS

Office Action mailed Jun. 16, 2011, in connection with U.S. Appl. No. 11/704,700.
Office Action mailed Jan. 10, 2012, in connection with U.S. Appl. No. 11/704,700.
Office Action mailed Aug. 5, 2013, in co-pending U.S. Appl. No. 13/711,603.
Office Action mailed Mar. 27, 2014, in co-pending U.S. Appl. No. 13/711,603.

* cited by examiner

DISPLAYING AN INFORMATION TICKER IN ASSOCIATION WITH A PERSONALIZED VIDEO MOSAIC IN A TELEVISION SERVICES NETWORK

CROSS-REFERENCE TO RELATED APPLICATIONS

The present application claims priority to U.S. Provisional Application No. 60/927,664, filed May 4, 2007, entitled "Generating A Personalized Video Mosaic In A Cable Services Network," which is incorporated herein by reference.

The present application is related to U.S. patent application Ser. No. 11/704,700, filed Feb. 9, 2007, entitled "Generating A Personalized Video Mosaic In A Cable Services Network," which is incorporated herein by reference.

BACKGROUND

With the advent of modern television services networks, such as cable and satellite systems, subscribers have grown accustomed to receiving a variety of television programming from numerous broadcasting sources. In recent years, technology advances have enabled subscribers to receive an even greater variety of products and services through television services networks. For example, modern cable services networks provide traditional video television programming, telephone services, high speed Internet access, electronic mail services, video-on-demand, information services, and the like. Through the use of set-top boxes (computing systems), cable and satellite television services providers can provide interactive television services to subscribers. Such interactive television services allow customers to interact directly with service providers in response to services and product offerings presented to the subscribers through their television sets.

Recently, many television services providers are beginning to offer dedicated "mosaic" channels in which live feeds of multiple programming are broadcast on a single video channel on the provider's networks. Currently, mosaic channels display a scaled down "windows" of currently broadcasting programs selected by the provider in one or more categories (i.e., news, sports, etc.) also selected by the provider, along with non-program based audio from a live host or background music.

Current mosaics, however, only offer content which is determined by the service provider. Thus, subscribers have no control over the programs which make up a particular mosaic channel. Moreover, the content selected by the service provider may not be of interest to some subscribers. It is with respect to these and other considerations that the present invention has been made.

SUMMARY

In accordance with the present invention, the above and other problems are solved by methods and systems for generating a personalized video mosaic from multiple video sources in a cable television services system. The methods and systems enable a subscriber to select multiple video sources broadcast from a head end for simultaneous display on a single broadcast channel in the cable television services system.

According to one aspect of the invention, a method is provided for generating a personalized video mosaic from multiple video sources in a cable television services system. The method includes receiving, in a cable television services head end, a subscriber selection of video sources from multiple video sources broadcast in the cable television services system. The method further includes generating, in the head end, a personalized video mosaic, the personalized video mosaic including three video sources selected by a subscriber. Finally, the method includes transmitting the personalized video mosaic from the head end to the subscriber for simultaneous viewing of the selected video sources on a broadcast channel in the cable television services system.

Various other aspects of the invention may be implemented by a head end and a set-top box in a cable television services system. The head end is operative to receive a subscriber selection of video sources from multiple video sources broadcast in the cable television services system and generate a personalized video mosaic from those sources. The head end then transmits the personalized video mosaic to the subscriber for simultaneous viewing of the selected video sources on a broadcast channel in the cable television services system. The set-top box is operative to receive the personalized video mosaic from the head end and which is further operative to execute an application program enabling the subscriber to individually select the video sources which make up the personalized video mosaic and transmit the selections to the head end. The set-top box is further operative to display the personalized video mosaic on the broadcast channel in the cable television services system.

Still other aspects of the invention may be implemented by an apparatus for generating a multiple video windows for use in a personalized video mosaic which includes multiple video sources broadcast in a cable television services system. The apparatus includes de-multiplexer means for de-multiplexing an input video stream including the multiple video sources, a transcoder for decoding and decompressing each of the video sources into a common raw format, a scalar for scaling the plurality of video sources from a full-screen format into configurable sized video windows, compression means for compressing the configurable sized video windows into a configurable bit stream at a configurable bit rate, and multiplexer means for multiplexing the compressed video windows into an output video stream for selecting the personalized video mosaic.

According to another aspect of the invention, a video source associated with an information ticker may be captured, and the associated information ticker may be broadcast and displayed below or near an array of simultaneously broadcast video sources being broadcast in a mosaic of video sources. According to this aspect, the displayed information ticker is broadcast in association with one of a plurality of simultaneously broadcast video sources in the mosaic of video sources.

These and various other features, as well as advantages, which characterize the present invention, will be apparent from a reading of the following detailed description and a review of the associated drawings.

DETAILED DESCRIPTION

Figure 1:
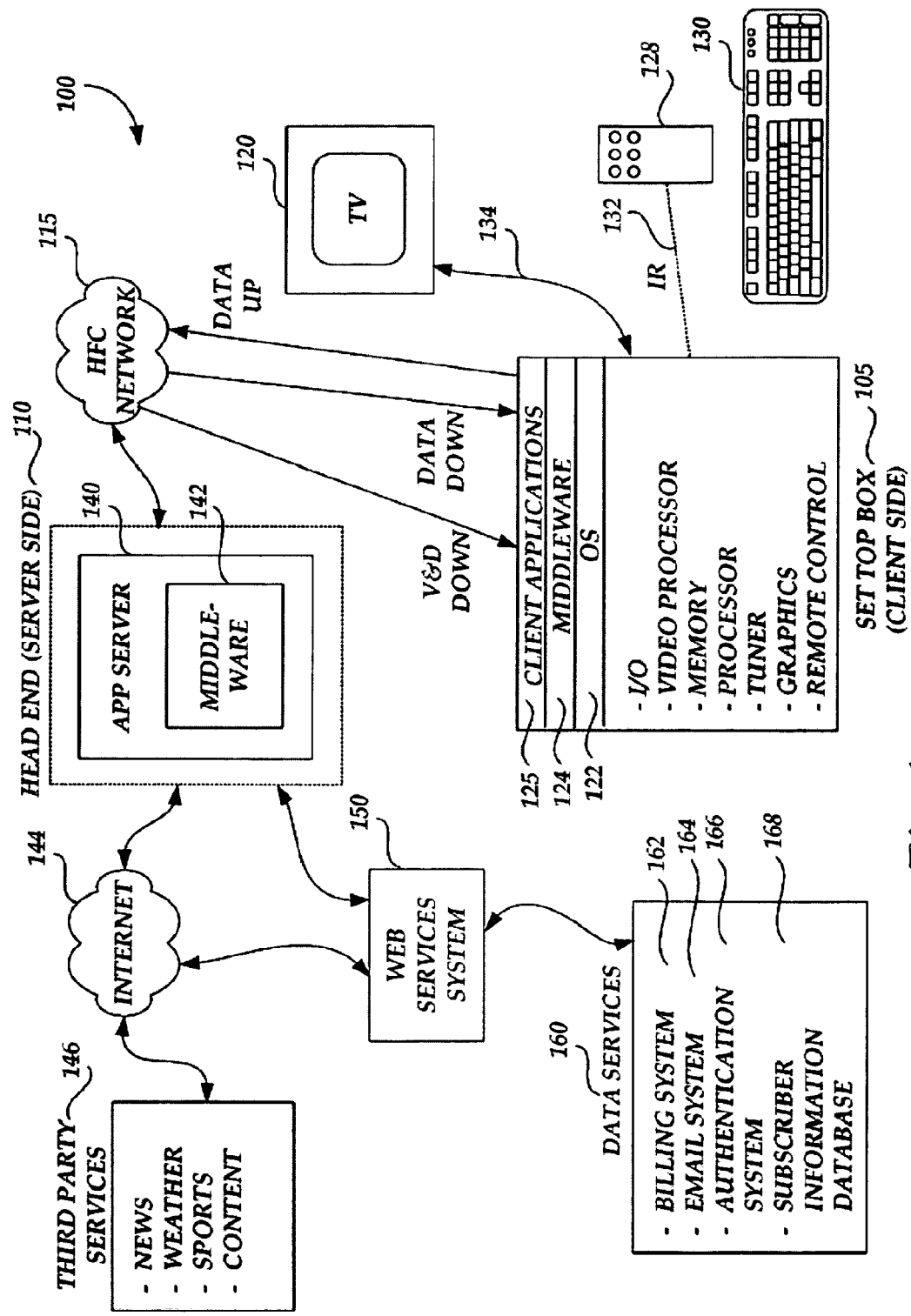
FIG. 1 is a network diagram illustrating a cable services network architecture that serves as an illustrative operating environment for the present invention.

Referring now to the drawings, in which like numerals represent like elements, various embodiments of the present invention will be described. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents. According to an actual embodiment, the present invention is implemented in a cable television/services system in communication with one or more telecommunications sources. FIG. 1 is a block diagram illustrating a cable television/services system architecture (hereinafter referred to as "CATV" system) that serves as an illustrative operating environment for the present invention.

Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (set-top box) functionally connected to a customer receiving device, such as the television set 120. As is understood by those skilled in the art, modern CATV systems may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box 105. Interactive television services that allow a customer to input data to the CATV system 100 likewise are provided by the set-top box 105. As illustrated in FIG. 1, the set-top box 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the set-top box 105 via a suitable communication transport such as the infrared connection 132. The set-top box 105 also includes a video processor for processing and providing digital and analog video signaling to the television set 120 via a cable communication transport 134. A multi-channel tuner is provided for processing video and data to and from the set-top box 105 and the server-side head end system 110, described below.

According to an embodiment, the set-top box 105 is a cable services receiver device that may operate as a separate box functionally connected to the television set 120 as illustrated and described herein. Alternatively, the set-top box 105 may be in the form of a receiver device that is incorporated internally in the television set 120 for receiving and distributing information to the television set as described herein.

The set-top box 105 also includes an operating system 122 for directing the functions of the set-top box 105 in conjunction with a variety of client applications 125. For example, in accordance with one embodiment of the present invention, a client application 125 enables a customer subscribed to a personal video mosaic service to select a list of multiple video sources (i.e., channels) comprising the personalized video mosaic for transmission to the head end 110 and enables the display of the personalized video mosaic broadcast channel on the television 120.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces ("APIs") that are exposed to the client applications 125 and operating systems 122 that allow the client applications to communicate with the operating systems through common data calls understood via the API set. As described below, a corresponding middleware layer is included on the server side of the CATV system 100 for facilitating communication between a server-side application server and the client-side set-top box 105. According to one embodiment of the present invention, the middleware layer 142 of the server-side application server and the middleware layer 124 of the client-side set-top box 105 format data passed between the client side and server side according to the Extensible Markup Language ("XML").

The set-top box 105 passes digital and analog video and data signaling to the television 120 via a one-way communication transport 134. The set-top box 105 may receive video and data from the server side of the CATV system 100 via the HFC network 115 through a video/data downlink and data via a data downlink. The set-top box 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the set-top box 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side set-top boxes 105 for presentation to customers via televisions 120. In accordance with the various embodiments of the present invention, the head end 110 is operative to generate a personalized video mosaic from multiple video sources broadcast in the CATV system 100 for distribution to the set-top box 105 and for presentation to customers via the television 120.

The application server 140 is a general-purpose computing system operative to assemble and manage data sent to and received from the client-side set-top box 105 via the HFC network 115. According to embodiments of the invention, the application server 140 may also be utilized to obtain subscriber profile data from services provider data services 160 for preparing a subscriber profile that may be utilized by the set-top box 105 for tailoring certain content provided to the customer.

As illustrated in FIG. 1, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail usage data. An authentication system 166 may include information such as secure user names and passwords utilized by customers for access to network services.

The subscriber information database 168 may include general information about customers such as place of employment, business address, business telephone number and demographic information such as age, gender, educational level, and the like as well as information about subscribed services such as whether or not a customer has high-speed Internet access, an e-mail account, and premium programming access. In addition to the aforementioned services and in accordance with the various embodiments of the present invention, the subscriber information database 168 may also include information as to whether or not a customer subscribes to the personalized video mosaic service briefly described above and which will be described in greater detail below. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. When the application server 140 requires customer profile data from one or more of the data services 160 for preparation or update of a customer profile, the application server 140 passes a data query to the web services system 150. The web services system formulates a data query to each of the available data services systems for obtaining any available data for a given customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer profile data. The customer profile data obtained by the web services system is assembled and is returned to the application server 140 for ultimate processing via the middleware layer 142, as described above.

Figure 2:
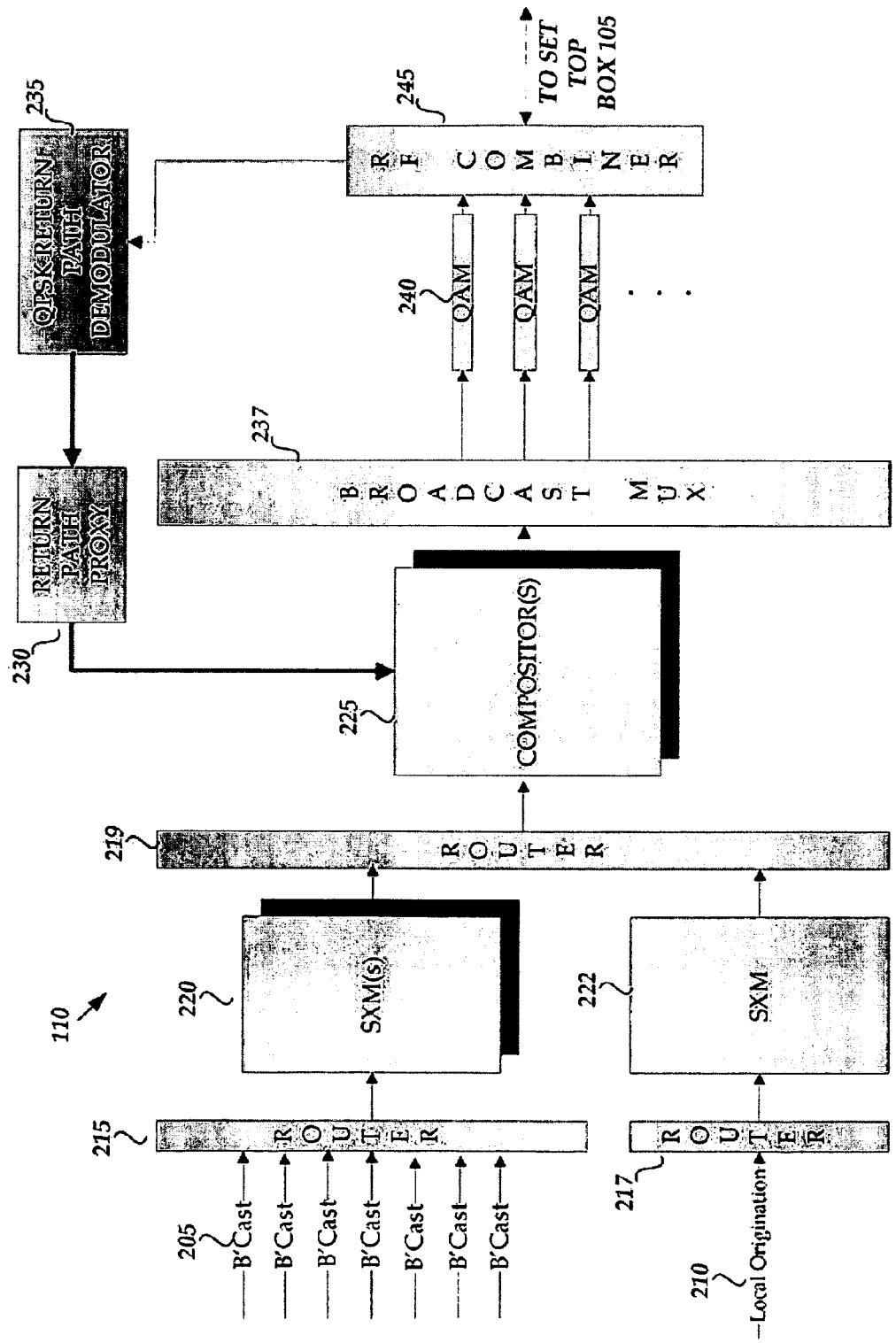
FIG. 2 is a hardware architecture diagram illustrating aspects of the various components and interfaces in a head end of the cable services network architecture of FIG. 1, according to the various embodiments of the present invention.

FIG. 2 is a hardware architecture diagram illustrating aspects of the various components and interfaces in the head end 110 of the CATV system 100 according to the various embodiments of the present invention. Referring now to FIG. 2, the head end 110 includes routers 215 and 217 for receiving multiple broadcast video sources 205, representing programming produced by national television networks, and multiple local origination video sources 210, representing programming produced by the CATV system 100, respectively.

It should be understood that the broadcast video sources 205 may comprise both analog and digital video sources. It should be appreciated that in one embodiment, the head end 110 may include additional hardware (not shown) for converting the analog video sources to digital video via analog-to-digital ("A/D") conversion. Various methods of A/D conversion are well known to skilled in the art. In one embodiment, the digital video sources (either native or converted from analog sources) may be formatted according to the MPEG-2 digital video compression standard although it will be appreciated by those skilled in the art that the digital video sources may be formatted according to other video compression standards, such as MPEG-4, or alternatively the digital video sources may in an uncompressed (i.e., raw) format.

The router 215 multiplexes the video sources 205 into a single video stream and forwards the video stream to a scaling transcoding multiplexer ("SXM") 220. Similarly, the router 217 multiplexes the video sources 210 into a single video stream and forwards the video stream to SXM 222. In one embodiment of the present invention, the multiplexed video streams forwarded to the SXMs 220 and 222 are gigabit Ethernet ("GbE") video streams with each stream including as many as 250 of 3.5 megabits per second quality MPEG-2 bit streams. It will be understood by those skilled in the art that the actual number of bit streams in a GbE stream may vary depending upon various factors including GbE overhead, initial stream bit rates, and the format of the input bit streams. Each of the encapsulated video sources in the multiplexed video streams received by the SXMs 220 and 222 may be identified by format and bit rate.

The multiplexed video streams forwarded by the routers 215 and 217 are attached to the SXMs 220 and 222. The SXMs 220 and 222 are operative to handle multiple input video streams and performs scaling, transcoding (i.e., converting from one format to another), and multiplexing of each input video stream (after being de-multiplexed from the received multiplexed video streams). The components comprising the SXMs 220 and 222 will be described in greater detail below with respect to FIG. 3.

The multiplexed output from the SXMs 220 and 222 are combined into a single output video stream by the router 219 and forwarded to compositors 225. In one embodiment of the present invention, the output video stream is a single GbE connection capable of handling thousands of compressed video streams (e.g., a single GbE connection may include 10,000 video sources at a 64 kilobit per second bit rate). The compositors 225 are general purpose computers which receive return channel input (via the set-top box 105) from return path proxy 230.

In particular, according to one embodiment, the compositors 225 are configured to receive a selection of video sources in the output video stream from return path proxy 230. The return path proxy 230 is a general purpose computer configured to receive video sources selected from the set-top box 105 by a subscriber via, for example, an on-demand session for utilizing a personalized video mosaic of subscriber-selected video sources or mosaic channels. The return path proxy 230 instructs the compositors 225 to select the video sources making up the personalized video mosaic from the output video stream. It will be understood by those skilled in the art that the return path proxy 230 may receive the return channel input via quadrature phase-shift key ("QPSK") return path demodulator 235 which demodulates signals received from the set-top box 105 via RF combiner 245.

After receiving the return channel input from the return path proxy 230, each of the compositors 225 composite (i.e., select, combine, and if necessary, convert) the video streams comprising the personalized video mosaic into a single video mosaic stream for delivery to a subscriber associated with the set-top box 105. For example, according to one embodiment of the present invention, the compositors 225 may be configured to composite MPEG-4 video sources into a single MPEG-2 (or MPEG-4) video mosaic stream for delivery to the subscriber. Those skilled in the art will understand that the mosaic video sources composited in the compositors 225 may undergo quadrature amplitude modulation ("QAM") via QAM units 240 prior to being communicated to the set-top box 105 via the RF combiner 245. The functionality of the compositors 225 will be described in greater detail below with respect to FIG. 5.

Figure 3:
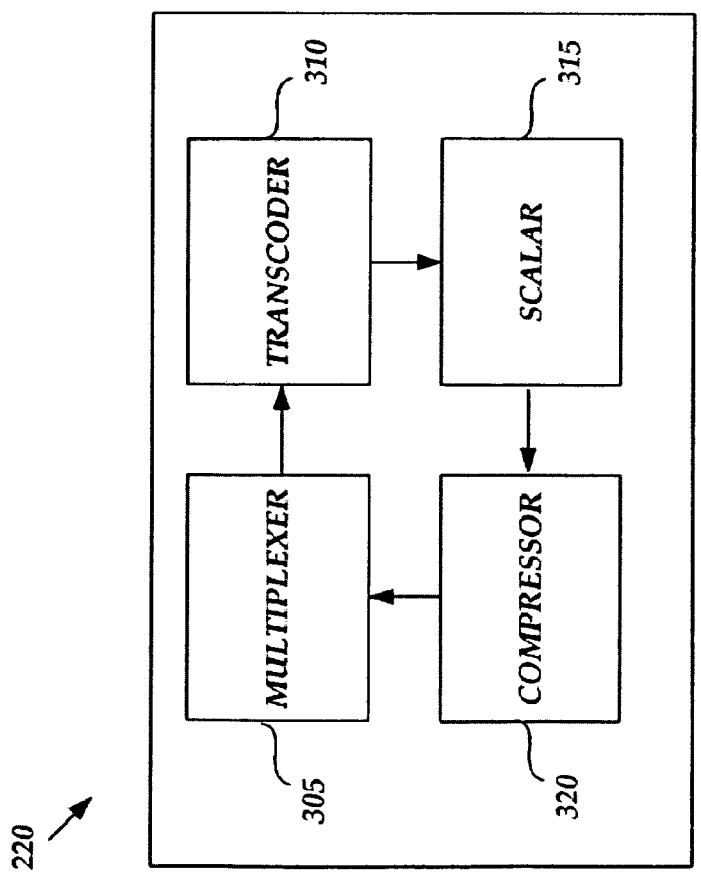
FIG. 3 is a hardware architecture diagram illustrating aspects of the various components in a Scaling Transcoding Multiplexer in a head end of the cable services network architecture of FIG. 1, according to an embodiment of the present invention.

FIG. 3 is a hardware architecture diagram illustrating aspects of the various components in the SXM 220 of the CATV system 100 according to one embodiment of the present invention. The SXM 220 includes a multiplexer 305, a transcoder 310, a scalar, 315, and a compressor 320. The multiplexer 305 performs both multiplexing and de-multiplexing functions with respect to broadcast video sources 205 received by the SXM 220 from the router 215 in the CATV system 100.

In particular, the multiplexer 205 de-multiplexes an input video stream comprising the broadcast video sources 205 and communicates the de-multiplexed video sources to the transcoder 310. The transcoder 310 transcodes each of the video sources into a common raw format. In particular, the transcoder 310 decodes and decompresses video sources which may have been formatted according to different digital video compression standards (e.g., MPEG-2, MPEG-4, etc.). Once each of the video sources has been transcoded into a common format, the video sources are then communicated to the scalar 315 which scales the video from each video source from an initial (i.e., full-screen) format into a configurable sized window. For example, a full screen size of 640×480 having 65,536 colors (i.e., 16-bit color) may be scaled down into a video window having a size of 80×60 with 256 colors (i.e., 8-bit color). After the video sources have been scaled into video windows, the video sources are communicated to the compressor 320 which compresses each of the video windows into a configurable bit-stream at a configurable bit rate. For example, the compressor 320 may compress the video window into an MPEG-4 bit-stream at a bit rage of 64 kilobits per second. The compressor 320 communicates the compressed video windows to the multiplexer 305 which combines each of the compressed video windows into a single output video stream. The multiplexer 305 also communicates the output video stream to the compositors 225 (via the router 219). It should be appreciated that the functionality of the multiplexer 305, the transcoder 310, the scalar 315, and the compressor 320 may be implemented using discrete or integrated components known to those skilled in the art.

Figure 4:
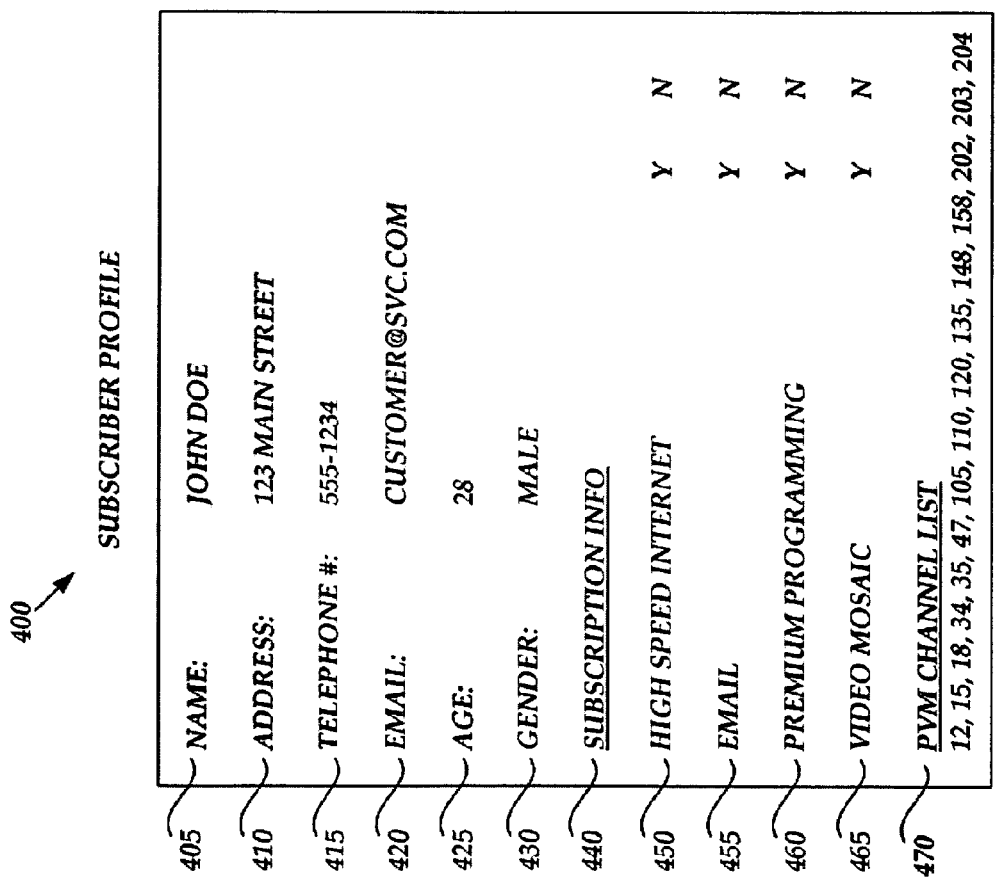
FIG. 4 is a simplified block diagram illustrating a customer profile data structure for providing subscriber profile data to a set-top box according to an embodiment of the present invention.

FIG. 4 is a simplified block diagram illustrating a customer profile data structure for providing customer profile data to a set-top box according to embodiments of the present invention. As described in FIG. 1 above, once the web services system 150 assembles required customer data, the customer data is passed back to the application server 140 where a customer profile 200 is prepared for transmission to the client-side set-top box 105 via the HFC network 115. The subscriber profile 400, illustrated in FIG. 4, is for purposes of example only. As should be appreciated by those skilled in the art, the subscriber profile may contain a variety of different types of information about a given customer that may be useful for content provision for the customer via the set-top box 105.

Referring to the customer profile 400, information gathered by the web services system 150 from one or more of the data services systems 160 is assembled into a data structure for provisioning the set-top box 105. As illustrated in FIG. 4, a name 405, address 410, telephone number 415, email address 420, age 425 and gender 430 for a given customer have been obtained and have been populated into the subscriber profile 400. As described above, such information may be gathered from any number of data services systems such as the billing system 162, the email system 164, the authentication system 166, or the subscriber information database 168. Additionally, following from the example subscriber profile 400, illustrated in FIG. 4, subscription information 440 for the associated customer has been obtained and has been populated into the subscriber profile. For example, information regarding services or products subscribed to by the customer is provided such as high-speed Internet subscription 450, email subscription 455, premium programming subscription 460, and video mosaic service 465. With respect to the video mosaic service 465, the subscription information 440 may also include customer preferences regarding which channels will be represented in the mosaic. These preferences may be indicated in a personalized video mosaic ("PVM") channel list 470.

Figure 5:
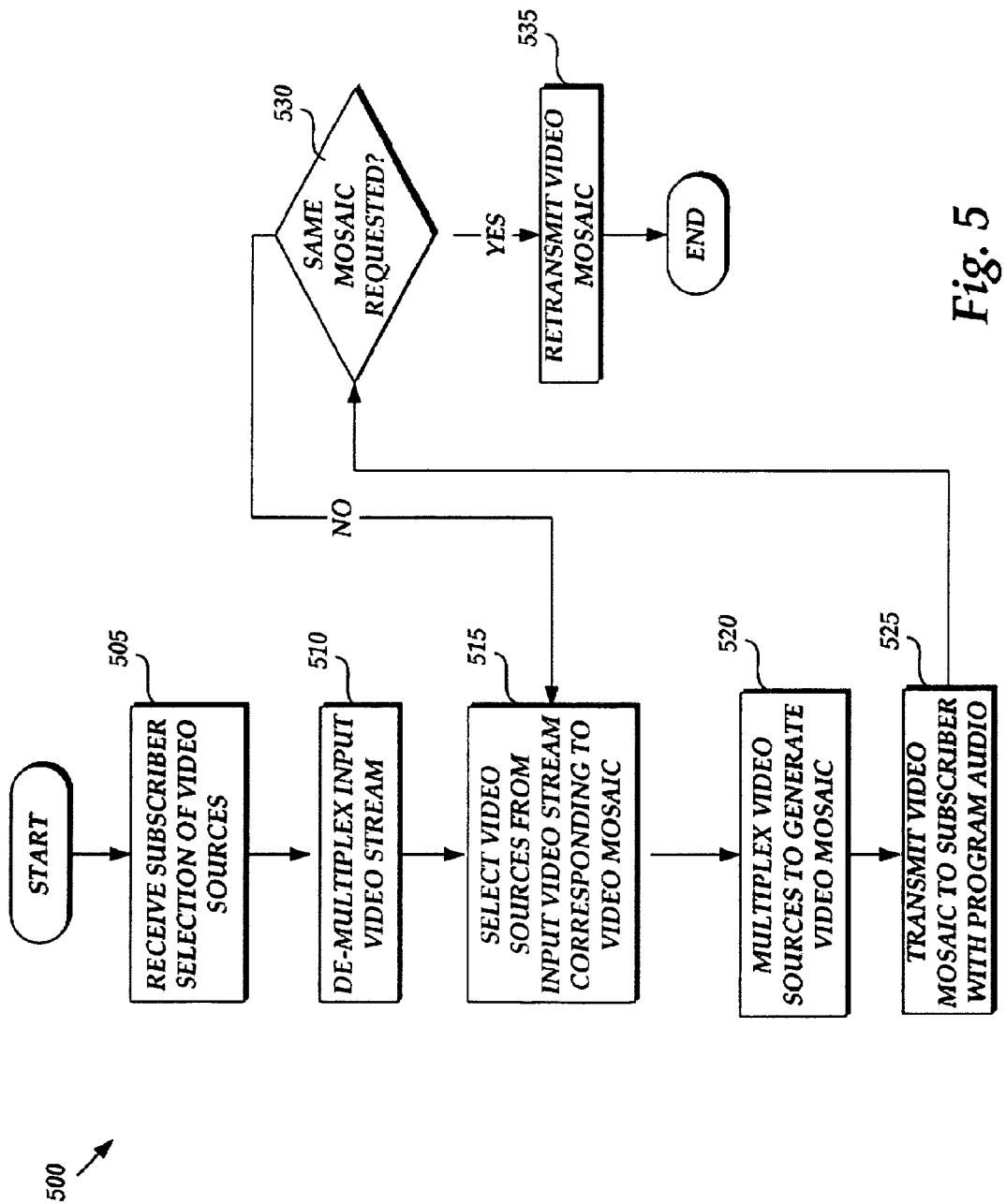
FIG. 5 is a flow diagram showing an illustrative routine for generating a personalized video mosaic from multiple video sources broadcast in the cable services network architecture of FIG. 1, according to an embodiment of the present invention.

Referring now to FIG. 5, an illustrative routine 500 will be described illustrating a process performed in the head end 110 of the CATV system 100 client applications 125 for generating a personalized video mosaic from multiple video sources. As described above, video sources for generating and displaying a personalized video mosaic are obtained and are utilized via a two-way communication between the head end 110 of the CATV system 100 and one or more client applications 125. However, as should be appreciated the desired video sources may be delivered to the client side (television set 120) via other suitable sources such as fiber to home deliver systems, satellite deliver systems, wireless deliver systems and combinations thereof. Thus, generation and display of the personalized video mosaic and information tickers, described below with respect to FIG. 7, may be performed from data received from other sources and via other communication mechanisms suitable for deliver of the desired video sources to the client side television set 120.

The routine 500 begins at operation 505, wherein the compositors 225 receive a subscriber selection of video sources comprising a personalized video mosaic. In particular, as described above, the compositors 225 receive a request for a specific personalized video mosaic from a subscriber associated with the set-top box 105 via the return path proxy 230. It will be appreciated that according to one embodiment of the present invention, the video sources or channels comprising the personalized video mosaic may be selected "on demand" by a subscriber using an interactive television ("ITV") user interface consisting of menus and selection boxes generated by the set-top box 105. After the subscriber selections have been made, they are sent via the return channel to the return path proxy 230 for forwarding to the compositors 225. According to an alternative embodiment of present invention, the channels comprising the personalized video mosaic may be retrieved from a subscriber profile, such as the subscriber profile 300 discussed in FIG. 3. In this embodiment, a subscriber may select video mosaic channels by updating the subscriber profile 300 stored in the set-top box 105. Once the set-top box 105 is initialized or booted, the subscriber profile including any selected personalized video mosaic channels are communicated to the return path proxy 230 for forwarding to the compositors 225.

The routine 500 then continues from operation 505 at operation 510 where the compositors 225 de-multiplex the input video stream received from the SXMs 220 and 222 via the router 219. As discussed above in FIGS. 2 and 3, the SXMs 220 and 222 have scaled broadcast and local origination video sources in the CATV system 2 into compressed video windows and multiplexed the video windows into a single video stream. The routine 500 then continues from operation 510 at operation 515 where the compositors 225 select video sources from the input video stream corresponding to the requested video sources comprising the personalized video mosaic. The routine 500 then continues from operation 515 at operation 520 where the compositors 225 multiplex the video sources to generate the personalized video mosaic. In particular, the compositors combine the various video windows corresponding to the subscriber selected channels into a single output video stream.

The routine 500 then continues from operation 525 at operation 530 where the compositors 225 transmit the personalized video mosaic to the requesting subscriber including program audio. In particular, the personalized video mosaic is transmitted to the requesting set-top box 105 which receives the mosaic and broadcasts each of the selected video windows simultaneously on a predetermined broadcast channel in the CATV system 100. It should be understood that the compositors 225 in transmitting the personalized video mosaic also transmits audio signals associated with each of the broadcast or local origination video sources comprising the personalized video mosaic, thus enabling a subscriber to listen to program audio while simultaneously viewing a selected video window on the predetermined broadcast channel in the CATV system 100. It should further be understood that the compositors 225 also transmits the position of the video windows comprising the personalized video mosaic to be displayed on a television screen display by the set-top box 105.

The routine 500 then continues from operation 530 at operation 535 where the compositors 225 determine if the same mosaic (i.e., the same video sources) has been requested by other subscribers. If, at operation 535, the same personalized video mosaic has not been requested, then the routine 500 returns to operation 510 where the compositors 225 select video sources corresponding to the newly requested mosaic. If, at operation 535, the same personalized video mosaic has been requested, then the routine 500 continues from operation 535 at operation 540 where the compositors 225 retransmit the personalized video mosaic to the additional subscriber set-top boxes. From operation 540, the routine 500 then ends.

Figure 6:
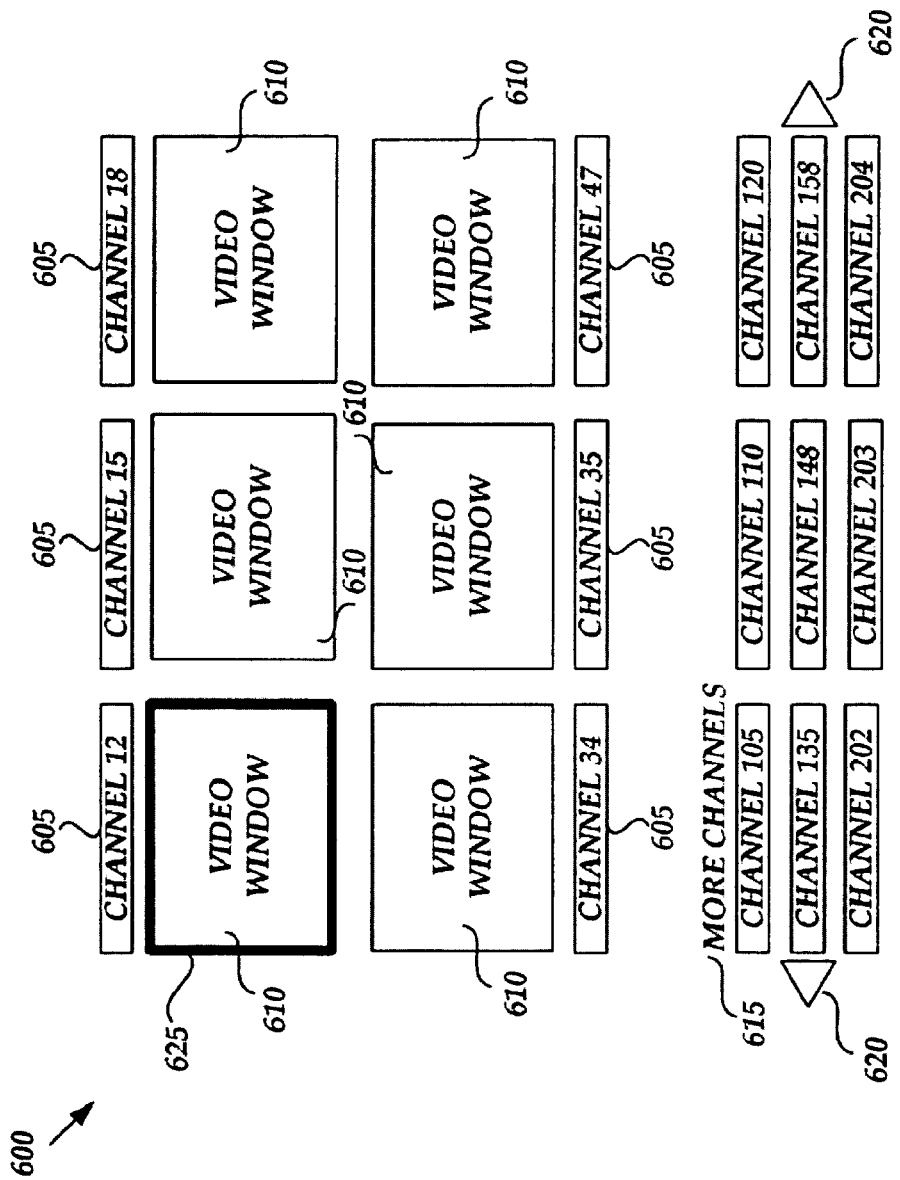
FIG. 6 is a simplified block diagram illustrating a television screen display of a video mosaic for displaying a personalized video mosaic according to an embodiment of the present invention.

FIG. 6 is a simplified block diagram illustrating a television screen display of a personalized video mosaic broadcast channel in the CATV system 100, in accordance with one embodiment of the invention. It should be understood that the layout and content of the television screen display illustrated in FIG. 6 is for purposes of example only and is not limiting of the variety of different layouts and types of content that may be included in such displays according to illustrative embodiments of the present invention.

Referring now to FIG. 6, the television screen display 600 includes a personalized video mosaic consisting of video windows 610 which show video streams corresponding to broadcast video sources (including local origination video sources) provided by the CATV system 100. In the mosaic, each of the video windows 610 are identified by channel banners 605 identifying each of the video sources displayed in the video windows 610 in the video mosaic. A selection window 625 may be used to select any of the video windows 610 displayed in the video mosaic. According to the various embodiments of the present invention, the selection window 625 is a graphical user interface which may be generated by the client applications 125 in the set-top box 105 whenever the tuner is tuned to a video mosaic channel. The selection window 625 may be used to move among the displayed video windows 610 using the remote control device 128. It should be understood that once a video window 610 is selected by the selection window 625, the client applications 125 instruct the set-top box 105 to transmit the current audio feed for the currently shown video stream to the television display device 120. That is, by selecting a video window 610 with the selection window 625, the subscriber not only is able to view the video stream but also hear the audio which is broadcast with the video stream in the CATV system 2. It should also be understood that the set-top box client applications 125 may enable the selection window 625 to "tune" to a selected video window 610 as if selecting a channel from an electronic program guide. Once a video window 610 has been tuned, the set-top box 105 generates a full-screen display of the corresponding channel.

The television screen display 600 also includes "More Channels" buttons 615 which are selectable buttons for adding video windows to the mosaic which will not fit on the television screen display 600. The More Channels buttons 615 may be selected by the remote control device 128 to tune to a selected channel. If the number of More Channels is larger than the space available on the television screen display 600, then scroll buttons 620 may be activated by the set-top box client applications 125 to enable the viewing and selection of the additional channels.

Figure 7:
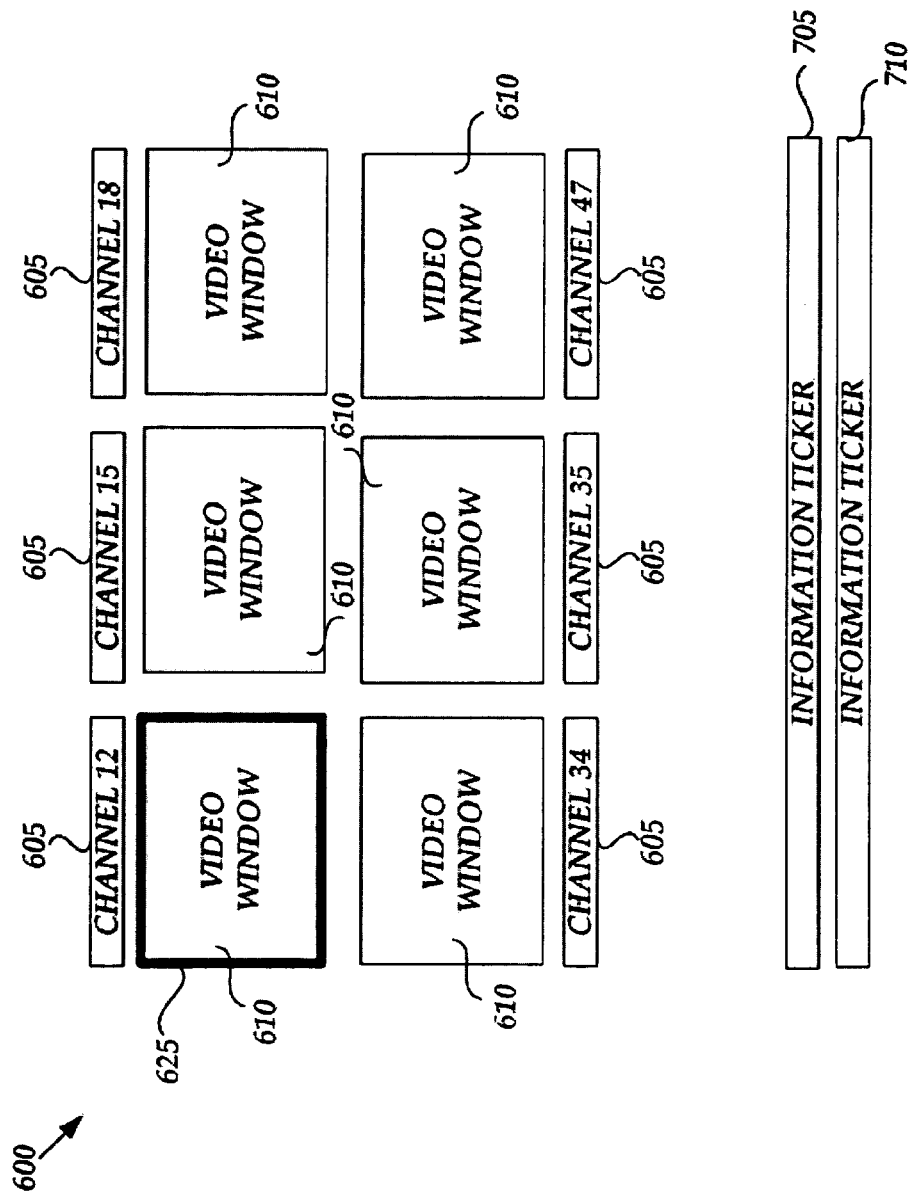
FIG. 7 is a simplified block diagram illustrating a television screen display of a video mosaic for displaying a personalized video mosaic having one or more information tickers below a selected mosaic video window.

FIG. 7 is a simplified block diagram illustrating a television screen display of a video mosaic for displaying a personalized video mosaic having one or more information tickers below a selected mosaic video window. According to another embodiment of the invention, a video source associated with an information ticker may be captured, and the associated information ticker may be broadcast and displayed below or near an array of simultaneously broadcast video sources being broadcast in a mosaic of video sources. According to this embodiment, the displayed information ticker is broadcast in association with one of a plurality of simultaneously broadcast video sources in the mosaic of video sources.

Alternatively, the information broadcast in the information ticker may be obtained from a source not associated with any of the broadcast video sources in the mosaic of video sources. For example, the information broadcast in the one or more information tickers may be from an additional source to allow a subscriber to view information in the one or more information tickers in addition to information available via one of the one or more video sources associated with the mosaic of video sources. In addition, information broadcast in a given information ticker may be in the form of an aggregate of information from a plurality of sources. For example, the information contained in an information ticker may include information from two or more sources that are broadcast according to some prescribed order.

According to an embodiment, one or more information tickers may be hidden from view and may be automatically expanded or launched into view upon focus on a given video window. In addition, the one or more information tickers may be positioned at various locations in the viewing screen of the associated television set. For example, the one or more tickers may be positioned along any edge of the viewing screen (i.e., top, bottom, right or left), or the information tickers may be positioned at other locations, for example, between two rows of video mosaic viewing windows.

As is well known to those skilled in the art, many broadcast channels include information tickers broadcast along an edge of the viewing screen, for example, along the bottom of the viewing screen to provide a viewing user with information in addition to that being provided by the primary audio and/or video broadcast. For example, many news services provide a news broadcast in which a news reader reads various news items and shows various live and recorded video presentations, but simultaneously, along a bottom edge of the viewing window, an information ticker is provided that scrolls across the screen and that provides various information. For example, an information ticker may provide news headlines, quotes from news makers, sports information, stock prices, weather information, advertising and the like. Indeed, any information that a given information source provider desires may be included in such an information ticker.

Referring now to FIG. 7, according to an alternative embodiment, when the video mosaic of FIG. 6 is broadcast, a user may select or focus on a particular video window 610 and cause a display of one or more information tickers 705, 710 for the selected or focused on video window. According to this embodiment, the selection window 625 may represent a highlighting bar displayed around a currently focused on video window. As should be appreciated, any number of highlighting mechanisms may be employed to indicate that a given video window is presently in focus. According to this embodiment, upon focus (for example, mouse-over or cursor insertion point) on a displayed video window 610, the selection window 625 may highlight the associated video window 610 as the currently focused-on window. Upon focus on a given window, an audio feed associated with the focused-on video window may begin so that a user may hear the audio feed for the focused-on broadcast while simultaneously being able to view the video windows 610 for the other channels comprising the video mosaic.

In addition, according to this embodiment, if the focused-on video window 610 is associated with a channel having a presently displayed information ticker, then the video signal associated with the information ticker for the focused-on video window may be captured in the same multiplexing manner/methods described above for capturing multiple video channels, and the captured information ticker signal may then be broadcast in an information ticker 705, 710, as illustrated in FIG. 7. Alternatively, only the information ticker 705, 710 may be presented upon focus on or selection of a given video window 610 without a presentation of the associated audio feed.

According to another embodiment, upon focus on or selection of a given video window 610, a user interface component may be launched which provides a user an opportunity to selectively play an audio portion of the focused-on or selected video window, or selectively display an available information ticker for the focused-on or selected video window, or both. Or, according to an alternative embodiment, a first information ticker 705 may be used to present information and a second information ticker may be used to present a captioning feed (printed form of associated audio) of the presently broadcast audio feed from the focused-on or selected video window for the hearing impaired or for those wishing to mute the audio feed for other purposes. In addition, according to an embodiment, an information ticker 705, 710 may be displayed simultaneously for each presently displayed video window 610 making up the video mosaic.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of displaying an information ticker in association with a personalized video mosaic, comprising:
   receiving, in a television services system, a subscriber selection of multiple video sources from a plurality of video sources broadcast in the cable television services system;
   generating, in the television services system, a personalized video mosaic, the personalized video mosaic comprising the subscriber selection of the multiple video sources;
   transmitting the personalized video mosaic to the subscriber for simultaneous viewing of the selected multiple video sources on a broadcast channel in the television services system;
   displaying the selected multiple video sources in the personalized video mosaic on the broadcast channel;

capturing a video source associated with information content obtained from a source not associated with any of the selected multiple video sources in the personalized video mosaic;

transmitting to the subscriber the video source associated with the information content selected by the subscriber separately from selection of the multiple video sources for forming the video mosaic for simultaneous viewing of the desired information content with the multiple video sources in the personalized video mosaic on the broadcast channel in the television services system;

hiding from view the information ticker including the video source associated with the desired information content selected by the subscriber separately from selection of the multiple video sources for forming the video mosaic until the subscriber focuses on a window of a video source in the personalized video mosaic; and upon the subscriber focusing on a window of a video source in the personalized video mosaic, displaying the captured video source associated with a desired information content to present moving information within a predetermined space to provide the information ticker on the broadcast channel associated with the personalized video mosaic proximate to, but separate from, each of the selected multiple video sources displayed in the personalized video mosaic, the moving information comprising the desired information content.

2. The method of claim 1, wherein the moving information comprising the desired information content is associated with one of the multiple video sources upon focusing on a window of a video source in the personalized video mosaic.

3. The method of claim 1, wherein the moving information comprising the desired information content includes a moving display of textual representation of an audio feed associated with the selected one of the multiple video sources.

4. The method of claim 1, further comprising displaying a highlighting around the focused-on displayed one of the multiple video sources to alert a subscriber as to the multiple video source with which the moving information comprising the desired information content displayed in the information ticker is associated.

5. The method of claim 1, wherein the moving information comprising the desired information content is selected from the group comprising: news information, entertainment information, sports information, business information, stock quotes, weather information, advertising, and printed form of audio presentation.

6. The method of claim 1, wherein generating the personalized video mosaic comprises:

de-multiplexing an input video stream comprising the plurality of video sources;

selecting the multiple video sources comprising the personalized video mosaic from among the plurality of video sources in the input video stream; and multiplexing the multiple video sources into an output video stream to generate the personalized video mosaic.

7. The method of claim 6, wherein de-multiplexing an input video stream comprising the plurality of video sources comprises de-multiplexing an input video stream including a plurality of video sources compressed into a configurable bit stream corresponding to a configurable bit rate, wherein each of the plurality of compressed video sources is scaled down from an initial format size into a configurable video window.

8. The method of claim 1, wherein transmitting the personalized video mosaic to the subscriber for simultaneous viewing of the selected multiple video sources on a broadcast channel in the cable television services system comprises transmitting program audio associated with each of the subscriber selected video sources.

9. The method of claim 1, wherein receiving, in a cable television services head end, a subscriber selection of multiple video sources from a plurality of video sources broadcast in the cable television services system comprises receiving subscriber profile data including the subscriber selection of multiple video sources.

10. The method of claim 1, wherein receiving, in a cable television services head end, a subscriber selection of multiple video sources from a plurality of video sources broadcast in the cable television services system comprises receiving a subscriber selection via one or more of an interactive television (ITV) session enabled via an ITV interface, a web services session wherein a subscriber profile containing one or more subscriber video source selections may be updated, or via a subscriber profile update session via a television services system client application operated on a television services receiver device.

11. A system for displaying an information ticker in association with a personalized video mosaic, comprising a head end operative to receive a subscriber selection of multiple video sources from a plurality of video sources broadcast in a cable television services system, generate a personalized video mosaic, the personalized video mosaic comprising the subscriber selection of the multiple video sources, to transmit the personalized video mosaic to the subscriber for simultaneous viewing of the multiple video sources on a broadcast channel in the cable television services system;

to display the selected multiple video sources in the personalized video mosaic on the broadcast channel;

to capture a video source associated with information content obtained from a source not associated with any of the selected multiple video sources in the personalized video mosaic;

to transmit to the subscriber the video source associated with the information content selected by the subscriber separately from selection of the multiple video sources for forming the video mosaic for simultaneous viewing of the desired information content with the multiple video sources in the personalized video mosaic on the broadcast channel in the television services system;

to hide from view the information ticker including the video source associated with the desired information content selected by the subscriber separately from selection of the multiple video sources for forming the video mosaic until the subscriber focuses on a window of a video source in the personalized video mosaic; and upon the subscriber focusing on a window of a video source in the personalized video mosaic, to display the captured video source associated with a desired information content to present moving information within a predetermined space to provide the information ticker on the broadcast channel associated with the personalized video mosaic proximate to, but separate from, each of the selected multiple video sources displayed in the personalized video mosaic, the moving information comprising the desired information content.

12. The system of claim 11 further comprising a receiver device operative to receive the personalized video mosaic from the head end and further operative to execute an application program enabling the subscriber to select the multiple video sources comprising the personalized video mosaic for transmission to the head end and display the personalized video mosaic on the broadcast channel.

13. The system of claim 11, wherein the head end in generating a personalized video mosaic, is operative to:
- de-multiplex an input video stream comprising the plurality of video sources;
- select the multiple video sources comprising the personalized video mosaic from among the plurality of video sources in the input video stream; and
- multiplex the multiple video sources into an output video stream to generate the personalized video mosaic.

14. The system of claim 13, wherein the head end in de-multiplexing an input video stream, is operative to de-multiplex an input video stream including a plurality of video sources compressed into a configurable bit stream corresponding to a configurable bit rate, wherein each of the plurality of compressed video sources is scaled down from an initial format size into a configurable video window.

15. The system of claim 14, wherein the head end in multiplexing the multiple video sources into an output video stream to generate the personalized video mosaic, is operative to multiplex the plurality of compressed video sources into an output video stream.

16. The system of claim 11, wherein the head end is further operative to retransmit the personalized video mosaic in response to receiving a selection of the multiple video sources from multiple subscribers.

17. The system of claim 11, wherein the head end in receiving a subscriber selection of multiple video sources from a plurality of video sources broadcast in the cable television services system, is operative to receive subscriber profile data including the subscriber selection of multiple video sources.

18. The system of claim 11, wherein the head end in receiving the subscriber selection of multiple video sources from a plurality of video sources, is operative to receive a selection via one or more of an interactive television (ITV) session enabled via an ITV interface, a web services session wherein a subscriber profile containing one or more subscriber video source selections may be updated, or via a subscriber profile update session via a cable television services system client application operated on a television services receiver device.

19. The system of claim 11, wherein the head end in transmitting the personalized video mosaic to the subscriber for simultaneous viewing of the selected multiple video sources on a broadcast channel in the cable television services system, is operative to transmit program audio associated with each of the subscriber selected video sources.

20. The system of claim 11, wherein the head end is further operative to transmit a position of the personalized video mosaic for viewing the personalized video mosaic on the broadcast channel.

21. The system of claim 12, wherein the set-top box application program is further operative to receive a selection of one of the subscriber selected video sources and tune to a broadcast channel for displaying the selected video source as a full screen.

* * * * *